Patented Dec. 24, 1940

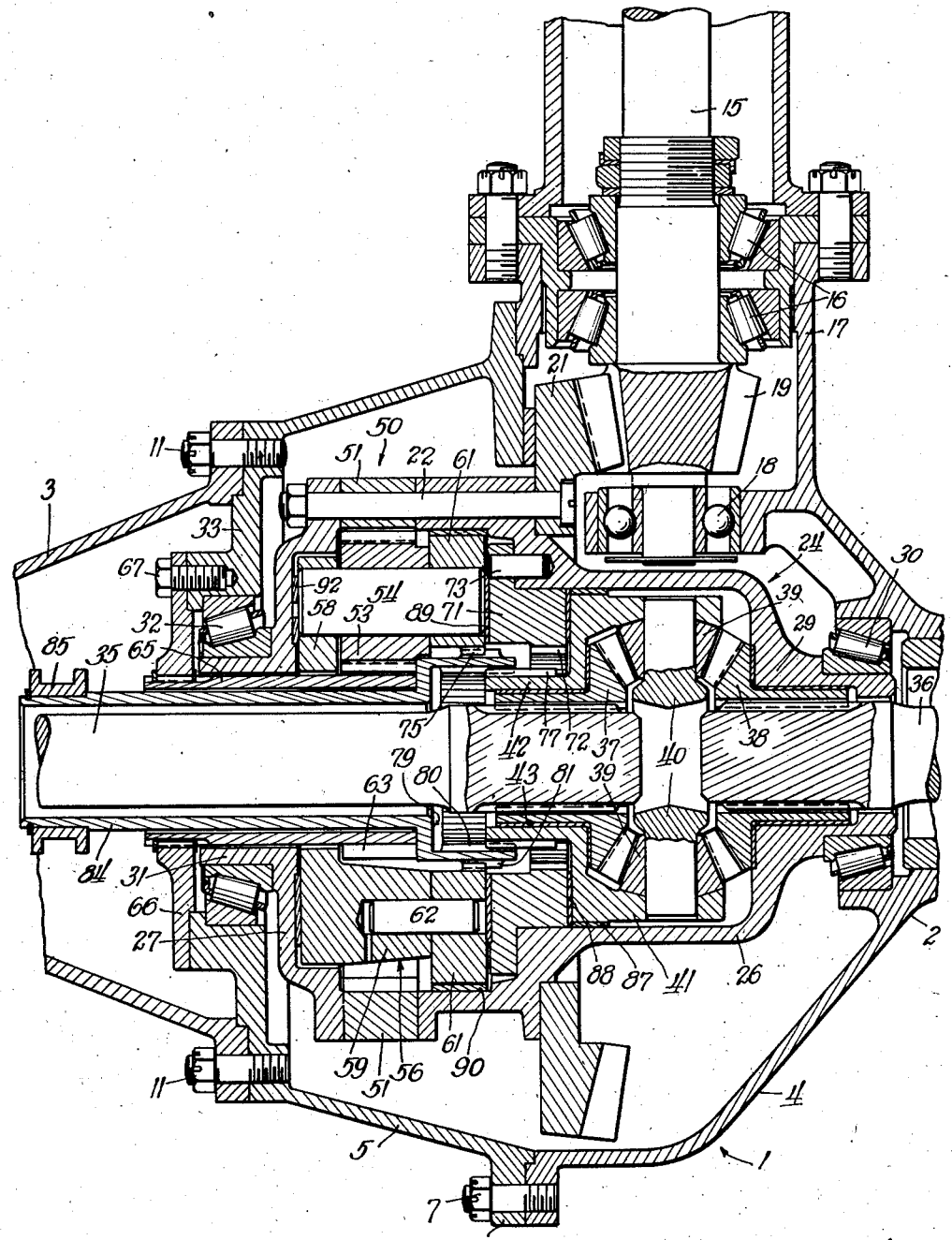

2,225,720

UNITED STATES PATENT OFFICE 2,225,720

DOUBLE REDUCTION AXLE

Herbert C. Snow, Cleveland, Ohio

Application June 22, 1939, Serial No. 280,489

18 Claims. (Cl. 74—314)

This invention relates generally to two-speed drive units for automotive vehicles and the like, and is particularly concerned with axles having change speed mechanism incorporated therein. In its broader aspects, however, this invention is not necessarily limited to axles or the like.

Two-speed or double reduction axles of various kinds have heretofore been provided in order to secure adequate and economical speeds when driving on level highways and power for negotiating hills and handling heavy loads, both without requiring any shifting of the conventional transmission gears. However, in changing from one ratio to the other in a two-speed axle, frequently objectionable clashing occurs, due partly to the fact that such shifts are made when the vehicle is traveling at a relatively rapid rate as, for example, in getting up speed for fast travel over smooth level highways, or in dropping down to the lower ratio when starting up a hill before much speed is lost. Thus, the shifts in a two-speed axle are made at considerably higher speeds than the conventional shifting operations in the ordinary main transmission, and therefore the problem of securing such shifts without noise and clashing is one of particular importance.

In practically all of the two-speed axles with which I am familiar, some form of gear reduction in the nature of planetary gearing has been used, with means operative in one position to lock the planetary gearing against relative movement, thereby driving the axle in direct high speed, such means being shifted into another position to lock the sun gear against rotation so as to transmit the drive at reduced speed at increased power through the planetary gearing. I have discovered that a considerable proportion of the clashing that sometimes occurs in making shifts in a two-speed axle is due to the considerable difference between the speeds of the parts which are brought into engagement when making one or the other of the shifts. In one type of two-speed axle with which I am familiar, the sun gear, or a part rotatable therewith, is shifted from a position in which it is locked to a stationary part to a position in which it is locked for rotation with some part that moves at axle speed. Having in mind that these shifts are made principally when the vehicle is moving at a relatively rapid rate and the axle speed is therefore relatively high, it is not surprising that clashing frequently occurs in making shifts.

With the above mentioned disadvantages of prior two-speed axles in mind, the object and general nature of this invention is the provision of a two-speed axle or other driving unit for automotive vehicles and the like in which, when changing from one speed to the other, the shift is made between parts, both of which are rotating, irrespective of whether the shift is from low ratio to high ratio or vice versa, and at speeds which are not greatly different one from the other. Another feature of this invention is the provision of a two-speed axle in which the shift from one speed to the other always takes place between parts whose speeds differ by an amount which is always less than the actual speed of rotation of the driving or driven parts.

More specifically, it is a feature of this invention to provide a two-speed axle in which the drive is transmitted from the driving bevel gear to the axle shafts either directly or through a planetary gear unit, as desired, and in which the shift to effect the speed selected takes place between parts one of which is connected with the member that drives the planetary gear unit and the other of which is connected with the driven member of the planetary gear unit, whereby the only difference in speeds between the two parts to be engaged is that afforded by the planetary gear unit itself, rather than a shift between a relatively rapidly rotating part and a stationary part, as in the prior art.

A further feature of this invention is the provision of a two-speed axle in which it is possible to use many of the parts of a standard single ratio axle. Also it is a feature of this invention to provide a two-speed driving axle in which a driving member may be connected to drive the axle shafts directly or to drive the same through a planetary gear unit, the two driving members always rotating at the same relative speeds with respect to each other at all times. Further, it is a feature of this invention to provide a two-speed driving axle in which a planetary gear unit is employed, with the sun gear held stationary and the driven member of the planetary gear unit rotating idly in direct drive. A further feature of this invention is the provision of a double reduction or two-speed axle embodying a planetary gear unit which is controlled by a shiftable sleeve that extends through a stationary sun gear and is arranged to connect the differential case of the axle optionally to a direct driving member or the driven member of the planetary gear unit.

These and other objects and advantages of the present invention will be apparent to those skilled in the art after a consideration of the following detailed description taken in conjunction with the accompanying drawing, in which the single figure is a sectional view of a double reduction driving axle embodying the principles of my invention.

Referring now to the drawing, the rear axle, indicated in its entirety by the reference numeral 1, is of a two-piece or divided type and includes two housing sections 2 and 3, the former being provided with an enlarged section 4 and the latter being connected to the latter through an extension 5. Stud bolts 7 secure the outer flange 8 of the housing extension 5 to the enlarged portion 4 of the right hand housing section 2, and similar stud bolts 11 fasten the left hand housing section 3 to the housing extension 5. A drive pinion shaft 15 is supported on bearings 16 in a sleeve extension 17 which is formed on the housing section 2. Rear bearings 18 support the rear end of the pinion shaft 15 in rear of the driving pinion 19. Power is transmitted to the pinion shaft 15 in any suitable manner, as by a propeller shaft (not shown) of conventional construction.

The driving pinion 19 meshes with a bevel gear 21 which is fixed, as by bolts 22, to a driving part in the form of a housing 24. The latter consists of two sections 26 and 27, the former having a reduced hub section 29 which receives the bearings 30 by which this end of the driving housing 24 is supported for rotation on the axle housing section 2. The other section 27 of the driving housing 24 is likewise provided with a reduced hub portion 31 which receives bearings 32 for supporting this end of the driving housing 24 on a radially inwardly extending flange section 33 formed integrally with the housing extension 5. A pair of axially aligned axle shafts 35 and 36 are journaled for rotation by any suitable means within the rear axle housing sections 2 and 3, and their inner ends extend through the hub sections 29 and 31 and receive differential gears 37 and 38, respectively, suitably fixed thereto. Differential pinions 39 carried on a differential spider 40 are meshed with the differential gears 37 and 38, and the differential spider 40 is carried by a differential case 41 which is disposed within the driving housing 24 and which is the part to be driven therefrom at either of two selected ratios. The differential case 41 is provided with a hub section 42 which closely embraces the hub of the differential gear 37, there being a bearing bushing 43 therebetween. In a similar way, the hub of the differential gear 38 has bearing support in the hub 29 of the driving housing 24.

The axle housing section 2 with its sleeve 17, the pinion shaft 15, 19, the ring gear 21, the axle shafts 35, 36 and the differential 37—40 are preferably of the same construction as a standard single ratio axle, so that these parts are generally interchangeable with similar parts of a standard axle.

Disposed within the driving housing 24 is a planetary gear unit indicated in its entirety by the reference numeral 50. The planetary gear unit includes a ring or orbit gear 51 which is apertured to receive the bolts 22, the latter serving to clamp the ring gear 51 rigidly between the two sections 26 and 27 of the driving housing 24. Meshing with the ring or orbit gear 51 is a plurality of planet gears 53 which are journaled for rotation on shafts 54 carried by and forming a part of a planet gear carrier 56. The latter includes a ring 58 apertured to receive one end of each of the planet gear shafts 54 and provided with a plurality of lugs 59 which extend across the space between the planet gears 53 and receive a second ring 61 which also forms a part of the planet gear carrier 56. The rings 58 and 61 are held against relative rotation by axially extending dowel pins 62 or other suitable means. The planet gears 53 mesh with a sun gear 63 which is carried by a sleeve 65, the outer end of which is splined and engaged with a plate 66 that is secured, as by cap screws 67, to the radial flange 33 of the axle housing extension 5. Through the plate 66 and radial extension 33, the sun gear 63 and its sleeve 65 are held against rotation at all times. The ring 61 of the planet gear carrier 56 is apertured corresponding to the ring 58 to receive the other end of each of the planet gear shafts 54.

A clutch part in the form of a ring 71 having clutch teeth 72 is fixed for rotation with the driving housing 24 by axially directed pins 73, and the radially inner portion of the planet gear carrier ring 61 is provided with clutch teeth 75, the two sets of clutch teeth 72 and 75 being of the same pitch, as shown. The hub 42 of the differential case 41 is splined, as at 77, and slidable axially on the splines is a shiftable clutch member 79 which has interior splines 80 and exterior clutch teeth 81. The clutch member 79 is extended axially in the form of a sleeve 84, carrying at its outer end a collar 85 which is grooved to receive any suitable form of shifting means. The splines 80 are of sufficient length so that the set of clutch teeth 81 of the clutch member 79 may be engaged optionally with either set, 72 or 75, of clutch teeth carried on the cooperating clutch parts 61 and 71.

Suitable bearings are provided for the various parts to facilitate their assembly and to maintain them in accurate alignment throughout the life of the axle. Mention has already been made that the hubs of the differential gears 37 and 38 receive, respectively, the hub 42 of the differential case 41 and the hub section 29 of the driving housing 24. An anti-friction bearing 87 is disposed between the outer circumference of the differential case 41 and the adjacent portions of the driving housing 24, and a thrust bearing 88 is disposed between the differential case 41 and the clutch ring 71. Another thrust bearing 89 is disposed between the clutch ring 71 and the ring or clutch part 61, which forms a part of the planet gear carrier 56 as mentioned above. A bearing 90 is disposed between the radially outer portion of the part 61 and the adjacent portion of the driving housing 24, and a thrust ring 92 is disposed between the section 27 of the driving housing 24 and the other planet gear carrier ring 58.

It will thus be seen that all of the parts, particularly of the planetary gear unit, may be easily and quickly assembled by dropping them into place in the driving housing 24 after the axles and differential have been connected together, and then all of the parts are maintained in proper relation by the clamping bolts 22 which fix the bevel gear 21 to the driving housing 24 and the ring gear 51 between the sections 26 and 27 thereof.

The operation of the rear axle construction just described is substantially as follows:

The shiftable clutch member 79 may occupy either of two positions, connecting the hub 42 of the differential case 41 to the member 61 or to the member 71, as desired. As shown, the shiftable clutch member 79 is in a position connecting the member 61 of the planetary gear carrier 56 to the hub 42 of the differential case 41. In this position, power delivered to the driving housing 24 by the pinion 19 and bevel gear 21 rotates the driving housing 24 which carries the ring gear 51 of the planetary gear unit. This causes the planet gears 53 to roll about the stationary sun gear 63, thereby advancing the gear carrier 56 at a reduced rate. The rotation of the gear carrier 56 drives the differential case 41 through the interengaged clutch parts. As shown, the gear reduction afforded by the planetary gear unit 50 is approximately one-third so that in the position shown the axle shafts 35, 36 are rotated at about 33⅓% less than the speed of rotation of the driving housing 24.

In the other position of the shiftable clutch member 79, the teeth 81 thereof engage the teeth 72 on the part 71, and since the latter is connected directly to the driving housing 24, the differential case 41 is in this position driven at the same speed as the driving housing 24, thereby affording direct drive.

It will be noted that, in both positions of the shiftable clutch member 79, the sun gear 63 is held stationary and that the planet gear carrier 56 always rotates at the stated ratio less than the driving housing 24 through which the ring gear 51 of the planetary gear unit 50 is connected. In direct drive, when the clutch member 79 connects directly the clutch part 71 and the hub 42 of the differential case 41, the planet gear carrier assembly merely idles at 33⅓% less than the speed of rotation of the driving housing 24 and associated parts. Therefore in making a shift, whether from direct to reduced speed, or from the latter to direct, the shift is made between two parts (namely 61 and 71) which are rotating within 33⅓% of each other. Thus, the relative tooth speed between the clutch parts to be engaged is materially less than would be the case if, as in the prior art, a clutch part were shifted between a stationary part and another part that rotated at the speed of the axle shafts, which usually is fairly high when making a change in speed at the rear axle.

While I have shown an axle construction, which may be either a front or rear axle, in which the two available speeds are direct and reduced speed, by reversing the relation of the ring gear and planet gear carrier, so that the latter is connected directly to the driving housing 24 and the ring or orbit gear is provided with clutch teeth to be engaged by the clutch sleeve 79, it is possible to provide an overdrive, in which when the drive is transmitted through the planetary gear unit the axle shafts are rotated at a rate greater than their rate of rotation in direct. Thus, I have provided an improved two-speed axle in which shifting is facilitated and in which there is little opportunity for clashing when making a shift from one speed to the other. Further, I have provided a two speed axle with the planetary gear reduction unit in which the parts are in mesh at all times but the ring or orbit gear and the planet gear carrier rotate idly in direct and in which the sun gear is stationary at all times, thereby providing an extremely simple and sturdy construction and which is silent in both speeds.

While I have shown and described above the preferred construction in which the principles of the present invention have been embodied, it is to be understood that my invention is not to be limited to the particular means shown and described above, but that, widely different means may be employed in the practice of the broader aspects of my invention.

What I claim, therefore, and desire to secure by Letters Patent is:

1. A two-speed driving unit comprising driving and driven parts, a pair of shafts connected to said driven part and extending through said driving part, a planetary gear unit driven from said driving part and including a sun gear and a driven member having a set of clutch teeth, and clutch means including a part extending through said sun gear for optionally connecting said driven part to said driving part or to said planetary driven member.

2. A two-speed driving unit comprising driving and driven parts, a pair of oppositely extending shafts connected with said driven part, the driving part having a set of clutch teeth, a planetary gear unit including a stationary sun gear, a plurality of planet gears meshing therewith, a planet gear carrier member receiving said planet gears, and a ring gear member meshing with said planet gears, means connecting one of said members with said driving part, the other member having a set of clutch teeth, and a shiftable clutch member surrounding one of said shafts and extending through the sun gear and connected to rotate with said driven part, said shiftable clutch member being movable into a position to engage one or the other of said sets of clutch teeth, whereby to drive said driven part from said driving part either directly or through said planetary gear unit.

3. A two-speed driving unit comprising a driving member, a ring gear fixed to rotate with said member, planet gears meshing with said ring gear, a rotatable planet gear carrier, a stationary sun gear meshing with said planet gears, a driven member, a pair of shafts connected with said driven member and extending into said driving member and means optionally connecting said driven member with said driving member or said planet gear carrier.

4. Change speed mechanism as defined in claim 3 in which said driving member and said planet gear carrier are each provided with a clutch section, and a shiftable clutch part connected with said driven member and optionally engageable with one or the other of said clutch sections.

5. A two-speed driving unit comprising a pair of shafts, a differential for driving said shafts including a differential case, a housing in which said shafts and differential are disposed, a driving gear member mounted for rotation in said housing and adapted to be driven by a source of power, a first set of clutch teeth movable with said driving gear, a planetary gear unit including a stationary sun gear fixed to said housing and held thereby against rotation, a plurality of planet gears meshing with said sun gear, a planet gear carrier member receiving said planet gears and a ring gear member meshing with said planet gears, means fixing one of said members to said driving gear, a second set of clutch teeth on the other member, and a shiftable clutch member connected in driving relation with said differential case and optionally movable from a position engaging one set of clutch teeth to another position engaging the other set of clutch teeth, whereby said differential case may be driven optionally at two different speeds.

6. In a two-speed driving axle having an axle housing, a pair of axle shafts journaled for rotation therein, and differential means connected with the inner ends of said axle shafts and including a differential case, change speed mechanism comprising a part embracing said differential means and journaled for rotation in said housing, a driving gear fixed thereto, a clutch part also fixed to said first part for rotation therewith at all times, a planetary gear unit including driving and driven members and a sun gear fixed to said housing and held against rotation at all times thereby, a second clutch part on the driven member of said epicyclic gear unit, and means for optionally connecting one or the other of said clutch parts to said differential case.

7. In a two-speed rear axle having an axle housing and axle shafts journaled for rotation therein, differential means including a case having a splined hub disposed about one of said axle shafts, a rotatable housing carrying a driving gear and supported for rotation at opposite ends in said axle housing, a clutch part fixed to said gear housing and having clutch teeth disposed adjacent said splined hub but rotatable relative thereto with said gear housing, a planetary gear unit including driving and driven members, a plurality of planet gears associated therewith, and a sun gear meshing with said planet gears, means fixing said sun gear to said axle housing to hold the sun gear against rotation, one of said planetary driving and driven members being fixed to said gear housing and rotatable therewith, clutch teeth formed on the other member adjacent said clutch part, and a shiftable clutch sleeve slidable on said splined hub and optionally engageable with one or the other of said sets of clutch teeth for transmitting the drive directly from said gear housing to said differential case or to the latter through said planetary gear unit.

8. A two-speed axle comprising a housing, axle shafts journaled for rotation therein in axial alignment, differential means connecting the inner ends of said axle shafts and including a differential case, a driving gear, a support therefor disposed for rotation about said differential case, a planetary gear unit including a driving part fixed to said gear support member, a sun gear fixed to said housing against rotation and a driven member, and a shiftable clutch sleeve extending outwardly through said sun gear and operative to connect said driven member or said driving gear support member optionally to said differential case to drive the latter at a selected ratio.

9. In an axle construction of the two-piece type including an axle housing section, a sleeve connected therewith, a pinion shaft journaled in said sleeve and carrying a pinion, a driving gear meshing with said pinion, a pair of axially aligned driving shafts, one of said shafts being mounted in said axle housing section, and differential means connecting the inner ends of said axle shafts, the combination of an axle housing extension fixed to said first mentioned axle housing section and pinion shaft receiving sleeve, a second axle housing section fixed to said housing extension, a support member carrying said driving gear and having one end journaled for rotation on said first axle housing section and the other end journaled for rotation on said axle housing extension, a part connected to drive said axle shafts through said differential means and provided with a clutch hub, a planetary gear unit including a plurality of planet gears, a sun gear fixed to said axle housing extension and extending outwardly through the end of said support member journaled thereon, a driving member and a driven member, one of said members being fixed to said support member, and clutch means extending outwardly through said sun gear and adapted to connect the clutch hub of said driving part optionally to said driven member or to said support member, whereby said driving part and the associated axle shafts may be driven optionally from said support member directly or through said planetary gear unit.

10. In a two-speed driving unit having a stationary housing and a pair of shafts therein connected together by differential gearing, a driving gear support journaled for rotation in said housing and embracing said differential gearing adjacent one end of the housing, a differential case for driving said differential gearing and including a clutch hub section, a clutch ring fixed for rotation to said gear support, a thrust bearing between said clutch ring and said differential case for restraining relative axial movement therebetween, a planetary gear unit including a stationary sun gear, a plurality of planet gears, a planet gear carrier member and a ring gear member, one of said last mentioned members being fixed to rotate with said driving gear support, the other member having a clutch section, a shiftable clutch member constantly connected with said clutch hub and optionally engageable with said clutch section or said clutch ring, a thrust bearing between said planet gear carrier member and said clutch ring, and a thrust bearing between said planet gear carrier member and the other end of said driving gear support.

11. In a two speed driving axle, said axle having a housing and a pair of differentially connected axle shafts, a bevel gear support including a first section journaled for rotation in said housing, a clutch ring mounted therein, axially extending pins fixing said clutch ring for rotation with said first section of the bevel gear support, said pins providing for assembly of said clutch ring by movement of the latter in an axial direction into position in said first section, a planetary gear unit comprising a ring gear, a plurality of planet gears, a sun gear meshing therewith, and a planet gear carrier comprising two ring sections disposed on opposite sides of said planet gears and axially extending pins connecting said ring sections and providing for their assembly in a generally axial direction, said driving bevel gear support including a second section, axially directed means clamping said first and second sections of said bevel gear support together with the ring gear of the planetary gear unit disposed therebetween, journal means supporting the second section of said bevel gear support for rotation in said axle housing, and shiftable means optionally connecting said planet gear carrier and said clutch ring in driving relation with said axle shafts.

12. Mechanism as defined in claim 11 in which said sun gear is fixed to the portion of said axle housing on which the second section of said driving gear support is journaled, and said optionally shiftable connecting means comprises a clutch sleeve surrounding one of said axle shafts and extending axially outwardly through said sun gear.

13. A two-speed driving unit for automotive vehicles and the like, comprising a pair of shafts, a housing in which said shafts are disposed, a driving part mounted for rotation in said housing and adapted to be driven by a source of power, a first set of clutch teeth movable with said driving part, a planetary gear unit including a stationary sun gear fixed to said housing and held thereby against rotation, a plurality of planet gears meshing with said sun gear, a planet gear carrier member receiving said planet gears and a ring gear member meshing with said planet gears, means fixing one of said members to said driving part, a second set of clutch teeth on the other member, and a shiftable clutch member connected in driving relation with said shafts and optionally movable from a position engaging one set of clutch teeth to another position engaging the other set of clutch teeth, whereby said shafts may be driven optionally at two different speeds.

14. A two-speed driving unit comprising a housing mounted for rotation, a driven part disposed therein, means for driving said rotatable housing, a clutch part fixed to said housing and having clutch teeth, a planetary gear unit disposed within said housing and including driving and driven members, a plurality of planet gears associated therewith, and a sun gear meshing with said planet gears, means fixing said sun gear against rotation, one of said planetary driving and driven members being fixed to said rotatable housing and rotatable therewith, clutch teeth formed on the other member adjacent said clutch part, and a shiftable clutch sleeve slidable in driving relation with said driven part and optionally engageable with one or the other of said sets of clutch teeth for transmitting the drive directly from said rotatable housing to said driven part or to the latter through said planetary gear unit.

15. A two-speed driving unit comprising a housing mounted for rotation, a driven shaft coaxially disposed for rotation in and relative to said rotatable housing, means for driving the latter, a clutch part fixed to said rotatable housing, a planetary gear unit including driving and driven members, a plurality of planet gears associated therewith, and a sun gear meshing with said planet gears and disposed about said driven shaft, means fixing said sun gear against rotation, means fixing one of said planetary driving and driven members to said rotatable housing, a second clutch part carried on the other member adjacent said first clutch part, a shiftable clutch sleeve having a splined connection with said driven shaft and disposed within and extending through said sun gear, and means for shifting said clutch sleeve optionally into engagement with one or the other of said clutch parts for transmitting the drive directly from said rotatable gear housing to said driven shaft or to the latter through said planetary gear unit.

16. A two-speed driving unit as set forth in claim 15 further characterized by a stationary housing in which said rotatable housing is journaled and to which said sun gear is fixed so as to be held thereby against rotation at all times.

17. A two-speed driving unit comprising a rotatable housing, a driven shaft journaled for rotation therein in axial alignment and extending outwardly therefrom at one end, means for driving said rotatable housing, a planetary gear unit including a driving part fixed to said rotatable driving housing, a sun gear encircling said driven shaft at said one end and extending outwardly thereof, means holding the outer end of said sun gear against rotation and a driven member, and a shiftable clutch sleeve extending outwardly of said rotatable housing through said sun gear and operative to connect said driven shaft optionally with said driven member or said rotatable housing.

18. A two-speed driving unit comprising a stationary housing, a driven shaft, a driving part including a first section journaled for rotation in said housing, a clutch ring mounted therein, axially extending pins fixing said clutch ring for rotation with said first section of said driving part, said pins providing for assembly of said clutch ring by movement of the latter in an axial direction into position in said first section, a planetary gear unit comprising a ring gear, a plurality of planet gears, a sun gear meshing therewith, and a planet gear carrier comprising two ring sections disposed on opposite sides of said planet gears and axially extending pins connecting said ring sections and providing for their assembly in a generally axial direction, said driving part including a second section, axially directed means clamping said first and second sections of said driving part together with the ring gear of the planetary gear unit disposed therebetween, journal means supporting the second section of said driving part for rotation in said stationary housing, and shiftable means optionally connecting said planet gear carrier and said clutch ring in driving relation with said driven shaft.

HERBERT C. SNOW.